(12) United States Patent
Chen et al.

(10) Patent No.: US 7,339,333 B2
(45) Date of Patent: Mar. 4, 2008

(54) MOTOR DRIVE CONTROL APPARATUS, MOTOR DRIVE CONTROL METHOD AND PROGRAM OF THE SAME

(75) Inventors: Zhiqian Chen, Anjo (JP); Isao Fujiwara, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 445 days.

(21) Appl. No.: 11/186,986

(22) Filed: Jul. 22, 2005

(65) Prior Publication Data
US 2006/0043919 A1    Mar. 2, 2006

(30) Foreign Application Priority Data
Sep. 1, 2004    (JP) .............................. 2004-254700

(51) Int. Cl.
*H02P 7/06*    (2006.01)
(52) U.S. Cl. ...................... 318/254; 318/439; 318/716; 318/802
(58) Field of Classification Search ................ 318/138, 318/139, 259, 439, 567, 599, 802, 807, 727, 318/701
See application file for complete search history.

(56) References Cited

U.S. PATENT DOCUMENTS

| | | | | |
|---|---|---|---|---|
| 6,011,367 | A * | 1/2000 | Oedl et al. ..................... | 318/38 |
| 7,026,774 | B2 * | 4/2006 | Inaba et al. ................... | 318/254 |
| 7,049,779 | B2 * | 5/2006 | Chen et al. .................... | 318/599 |
| 7,187,155 | B2 * | 3/2007 | Matsuo et al. ................ | 318/807 |
| 7,271,557 | B2 * | 9/2007 | Ajima et al. .................. | 318/432 |
| 7,279,863 | B2 * | 10/2007 | Ahn et al. ..................... | 318/701 |
| 2006/0022623 | A1 * | 2/2006 | Inaba et al. ................... | 318/254 |
| 2006/0049792 | A1 * | 3/2006 | Chen et al. .................... | 318/716 |
| 2006/0076911 | A1 * | 4/2006 | Kuroshima et al. .......... | 318/254 |

FOREIGN PATENT DOCUMENTS

JP    B2 3395815    2/2003

* cited by examiner

*Primary Examiner*—Paul Ip
(74) *Attorney, Agent, or Firm*—Oliff & Berridge, PLC

(57) ABSTRACT

A general-purpose comparator can be used as a comparison processing module to reduce the costs of a motor drive control apparatus. The apparatus has an electric machine; a magnetic pole position computation processing module; a pattern generation processing module; a switching angle computation processing module which computes a switching angle where switching is done in a next control period based on a pulse pattern; a comparison processing module which compares the magnetic pole position with the computed switching angle to generate a comparison signal; and an on-off output processing module which generates a PWM signal based on the comparison signal indicative of the comparison result. In this case, because the magnetic pole position is compared with the computed switching angle to generate the PWM signal based on the comparison signal, a general-purpose comparator can be used as the comparison processing module.

6 Claims, 3 Drawing Sheets

US 7,339,333 B2

MOTOR DRIVE CONTROL APPARATUS, MOTOR DRIVE CONTROL METHOD AND PROGRAM OF THE SAME

This application claims priority from JP2004-254700, filed Sep. 1, 2004, the disclosure of which is incorporated in its entirety herein.

BACKGROUND

The disclosure relates to a motor drive control apparatus, a motor drive control method and a program of the same.

Traditionally, in a drive motor or generator disposed as a electric machine, a rotor is rotatably disposed which has a magnetic pole pair formed of north- and south-pole permanent magnets, and a stator is disposed in the outward radial direction from the rotor, the stator having coils of U-phase, V-phase, and W-phase.

A motor drive apparatus is disposed which drives the drive motor or generator to generate drive motor torque (torque of the drive motor) or generator torque (torque of the generator), and a motor drive control apparatus is disposed in order to control the motor drive apparatus. The motor drive control apparatus has a drive motor control unit which drives the drive motor and a generator control unit which drives the generator as electric machine control units. The drive motor or generator control unit sends pulse width modulation (PWM) signals of U-phase, V-phase, and W-phase generated in the electric machine control unit to an inverter, and feeds phase current generated in the inverter, that is, the currents in U-phase, V-phase, and W-phase to the individual stator coils to conduct PWM control for generating the drive motor torque and the generator torque.

The PWM control has asynchronous PWM control that generates asynchronous PWM signals in a sine wave PWM pattern, and synchronous PWM control that generates synchronous PWM signals in a pulse pattern formed of odd-numbered pulses, that is, a one-pulse pattern, a three-pulse pattern, a five-pulse pattern, a seven-pulse pattern, and so on. A motor drive control apparatus is provided which can switch between the asynchronous PWM control and the synchronous PWM control. In the motor drive control apparatus, the asynchronous PWM control is conducted in a medium-speed rotation area or low-speed rotation area and the synchronous PWM control is conducted in a high-speed rotation area (for example, see JP03-395815).

Next, a drive motor control unit, such as found in JP03-395815, that can conduct the synchronous PWM control will be described.

FIG. 2 is a block diagram illustrating the essential part of a traditional drive motor control unit. In the drawing, 22 denotes a phase counter. The phase counter 22 receives an A-phase signal SG-A and a B-phase signal SG-B that are sent as magnetic pole position signals from a magnetic pole position sensor (not shown) and computes the magnetic pole position θ based on the signals SG-A, SG-B.

A voltage command value computation processing part 48 has a current control part 61 and a voltage command converting part 63. The current control part 61 reads a d-axis current command value id* and a q-axis current command value iq*, and computes a d-axis voltage command value vd* and a q-axis voltage command value vq* based on the d-axis current command value id* and the q-axis current command value iq*. The voltage command converting part 63 reads the d-axis voltage command value vd* and the q-axis voltage command value vq*, and computes the voltage amplitude |v| and the voltage phase angle γ on the d-q coordinates based on the d-axis voltage command value vd* and the q-axis voltage command value vq*.

A PWM generator 50 has an adder 65, a percent modulation computing part 71, a pattern generating part 72, a magnitude comparator 74 as a comparison processing module, and an on-off output part 75. It reads the magnetic pole position θ, the voltage amplitude |v|, and the voltage phase angle γ, and generates pulse width modulation signals Mu, Mv, Mw in a one-pulse pattern, for example, the signals are the synchronous PWM signals of U-phase, V-phase, and W-phase.

Therefore, the adder 65 receives the magnetic pole position θ and the voltage phase angle γ, adds the voltage phase angle γ to the magnetic pole position θ, and computes the voltage phase angle β on the fixed coordinates. The percent modulation computing part 71 reads the DC voltage Vdc of an inverter as well as reads the voltage amplitude |v| from the voltage command converting part 63, and computes the percent modulation ρ indicative of the voltage utilization rate based on the voltage amplitude |v| and a value 0.78×Vdc that represents acceptable voltage:

$$\rho = |v|/(0.78 \times Vdc).$$

The pattern generating part 72 reads the percent modulation ρ, generates a one-pulse pattern in response to the percent modulation ρ, and computes the switching voltage phase angle βj (j=u, v, w) indicative of the switching angle in the individual phases on the fixed coordinates and the output level va in order to define the one-pulse pattern. The magnitude comparator 74 reads the voltage phase angle β and the switching voltage phase angle βj, and generates the on-off switching signal ε at the timing when the voltage phase angle β exceeds the switching voltage phase angle βj. When the output level va and the on-off switching signal ε are inputted, the on-off output part 75 generates the pulse width modulation signals Mu, Mv, Mw, that are the synchronous PWM signals in the individual phases, based on the output level va and the on-off switching signal ε. The pulse width modulation signals Mu, Mv, Mw have the output level va as amplitude, and are activated when the on-off switching signal ε is turned on and deactivated when it is turned off.

SUMMARY

However, in the traditional drive motor control unit, because the voltage phase angle β is compared with the switching voltage phase angle βj in the magnitude comparator 74, the unit cannot use a general-purpose microcomputer that does not have the magnitude comparator 74, leading to a cost increase in the motor drive control apparatus.

The invention is, at a minimum, to solve the problem of the traditional drive motor control unit. An object is to provide a motor drive control apparatus, a motor drive control method and a program of the same, which can use a general-purpose comparator as the comparison processing module and curtail the cost of the motor drive control apparatus.

To this end, an exemplary motor drive control apparatus includes an electric machine; a magnetic pole position computation processing module which computes a magnetic pole position of the electric machine; a pattern generation processing module which generates a pulse pattern formed of a switching angle and an output level; a switching angle computation processing module which computes a switching angle where switching is done in a next control period based on the pulse pattern; a comparison processing module which compares the magnetic pole position with the computed switching angle to generate a comparison signal indicative of a comparison result; and an on-off output processing module which generates a PWM signal based on the comparison signal.

Further, with exemplary motor drive control apparatus, the switching angle computation processing module may have a switching voltage phase angle prediction processing module which predicts a switching voltage phase angle where switching is done in the next control period; and a switching magnetic pole position angle computation processing module which computes a switching magnetic pole position angle where switching is done in response to the switching voltage phase angle. Additionally, the magnetic pole position computation processing module may be a phase counter, and the comparison processing module may be a comparison match comparator.

An exemplary motor drive control method includes computing a magnetic pole position of an electric machine; generating a pulse pattern formed of a switching angle and an output level; computing a switching angle where switching is done in a next control period based on the pulse pattern; comparing the magnetic pole position with the computed switching angle to generate a comparison signal indicative of a comparison result; and generating a PWM signal based on the comparison signal.

An exemplary program of a motor drive control method allows a computer to function as a magnetic pole position computation processing module which computes a magnetic pole position of a electric machine; a pattern generation processing module which generates a pulse pattern formed of a switching angle and an output level; a switching angle computation processing module which computes a switching angle where switching is done in a next control period based on the pulse pattern; a comparison processing module which compares the pole magnetic pole position with the computed switching angle to generate a comparison signal indicative of a comparison result; and an on-off output processing module which generates a PWM signal based on the comparison signal.

As noted, the magnetic pole position is compared with the computed switching angle to generate the PWM signal based on the comparison signal indicative of the comparison result. Thus, a comparator mounted as the comparison processing module on a general-purpose microcomputer can be used, and the cost of the motor drive control apparatus can be reduced.

BRIEF DESCRIPTION OF THE DRAWINGS

The disclosure can be readily understood by considering the following detailed description in conjunction with the accompanying drawings, in which.

DETAILED DESCRIPTION OF EMBODIMENTS

Hereinafter, an exemplary embodiment will be described in detail with reference to the drawings. In this case, a motor drive control apparatus adapted to a drive motor control unit as an electric machine control unit will be described.

Figure 3:
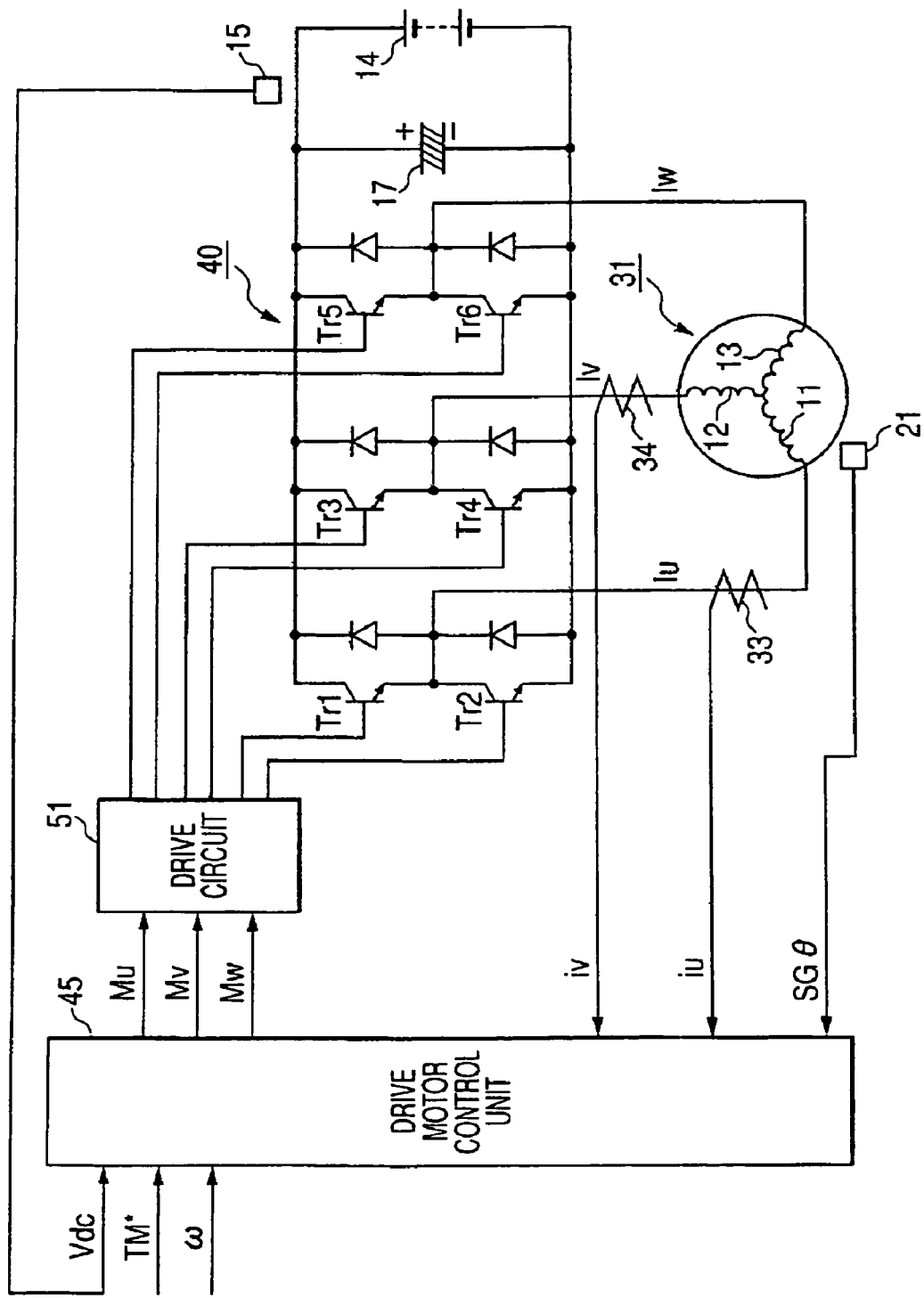
FIG. 3 is a conceptual diagram illustrating a motor drive control apparatus of an exemplary embodiment.

In FIG. 3, 31 denotes a drive motor as a electric machine. The drive motor 31 has a rotor (not shown) which is mounted on a drive axis (not shown) of a motor vehicle, such as an electric car, and is rotatably disposed thereon, and a stator which is disposed in the outward radial direction from the rotor. The rotor has a rotor core, and a permanent magnet which is disposed at multiple places at equal pitches in the circumferential direction of the rotor core. A magnetic pole pair is configured of the south pole and the north pole of the permanent magnet. The stator has a stator core with teeth which project toward the inward radial direction at multiple places in the circumferential direction, and stator coils 11 to 13 of U-phase, V-phase, and W-phase wound on the teeth.

On the output axis of the rotor, a magnetic pole position sensor 21 is disposed as a magnetic pole position detecting part which detects the magnetic pole position of the rotor, and the magnetic pole position sensor 21 generates the magnetic pole position signal SGθ as the sensor output, and sends it to a drive motor control unit 45. In the embodiment, a resolver is used as the magnetic pole position sensor 21.

In order to drive the drive motor 31 to run the electric car, an inverter 40, as a current generating unit, converts direct current from a battery 14 to phase current, that is, the currents Iu, Iv, Iw in U-phase, V-phase, and W-phase, and the currents Iu, Iv, Iw in the individual phases are fed to the stator coils 11 to 13.

To this end, the inverter 40 has six transistors Tr1 to Tr6 as switching devices. The inverter 40 sends a drive signal generated in a drive circuit 51 to the individual transistors Tr1 to Tr6, and selectively turns the individual transistors Tr1 to Tr6 on and off to generate the currents Iu, Iv, Iw in the individual phases. For the inverter 40, a power module, such as insulated gate bipolar transistor (IGBT) that two to six switching devices are assembled in a single package can be used, or intelligent power module (IPM) formed by assembling a drive circuit in IGBT can be used.

Disposed at the inlet side in feeding current from the battery 14 to the inverter 40, is a voltage sensor 15 as a voltage detecting part. The voltage sensor 15 detects the DC voltage Vdc on the inlet side of the inverter 40, and sends it to the drive motor control unit 45. In addition, the battery voltage can be used as the DC voltage Vdc. In such a case, a battery voltage sensor is disposed, as the voltage detecting part, on the battery 14.

The motor drive apparatus is configured of the drive motor 31, the inverter 40, the drive circuit 51, and drive wheels (not shown). Reference no. 17 denotes a condenser.

Because the stator coils 11 to 13 are connected in a star topology, when the current values in two phases are determined in the individual phases, the current value of the remaining phase is determined. Thus, in order to control the currents Iu, Iv, Iw in the individual phases, for example, current sensors 33, 34 are disposed as current detecting parts which detect U-phase current Iu and V-phase current Iv on the lead wire of the U-phase and V-phase stator coils 11, 12. The current sensors 33, 34 send the detected currents as the detected currents iu, iv to the drive motor control unit 45.

In addition to a central processing unit (CPU) which functions as a computer, a recording unit, such as RAM and ROM, which stores data and records various programs is disposed in the drive motor control unit 45, the CPU and the recording unit are not shown, and a current command value map is set in the recording unit. An micro-processing unit (MPU) can be used instead of the CPU.

Although the ROM is configured to store various programs and data, programs and data can be stored in other recoding media, such as a hard drive provided as an external storage. In this case, for example, flash memory is provided for the drive motor control unit 45, and the programs and data are read out of the recording medium, and are stored in the flash memory. Therefore, the external recording medium can be replaced to update the programs and data.

Figure 1:
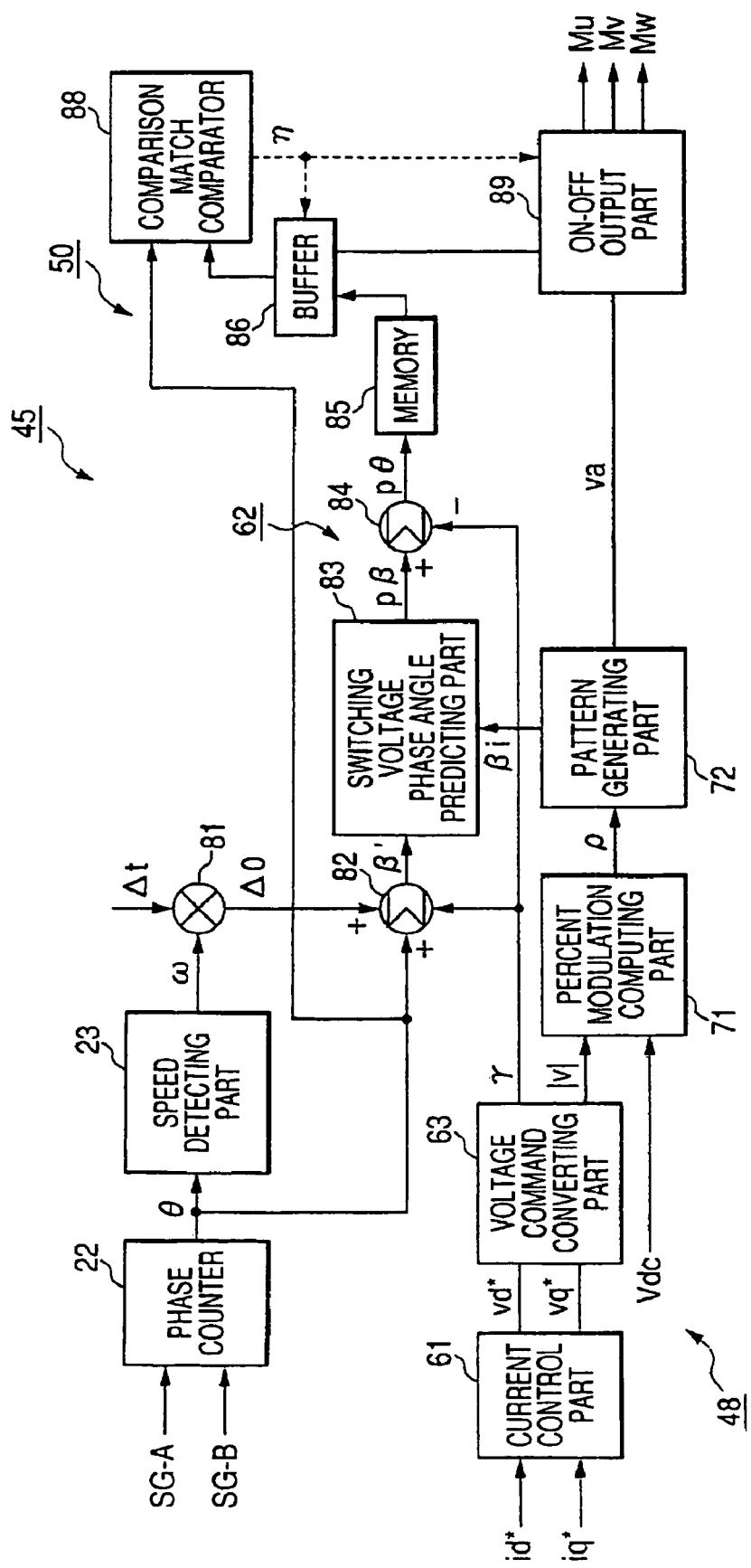
FIG. 1 is a block diagram illustrating the essential part of a drive motor control unit of an exemplary embodiment.
Figure 2:
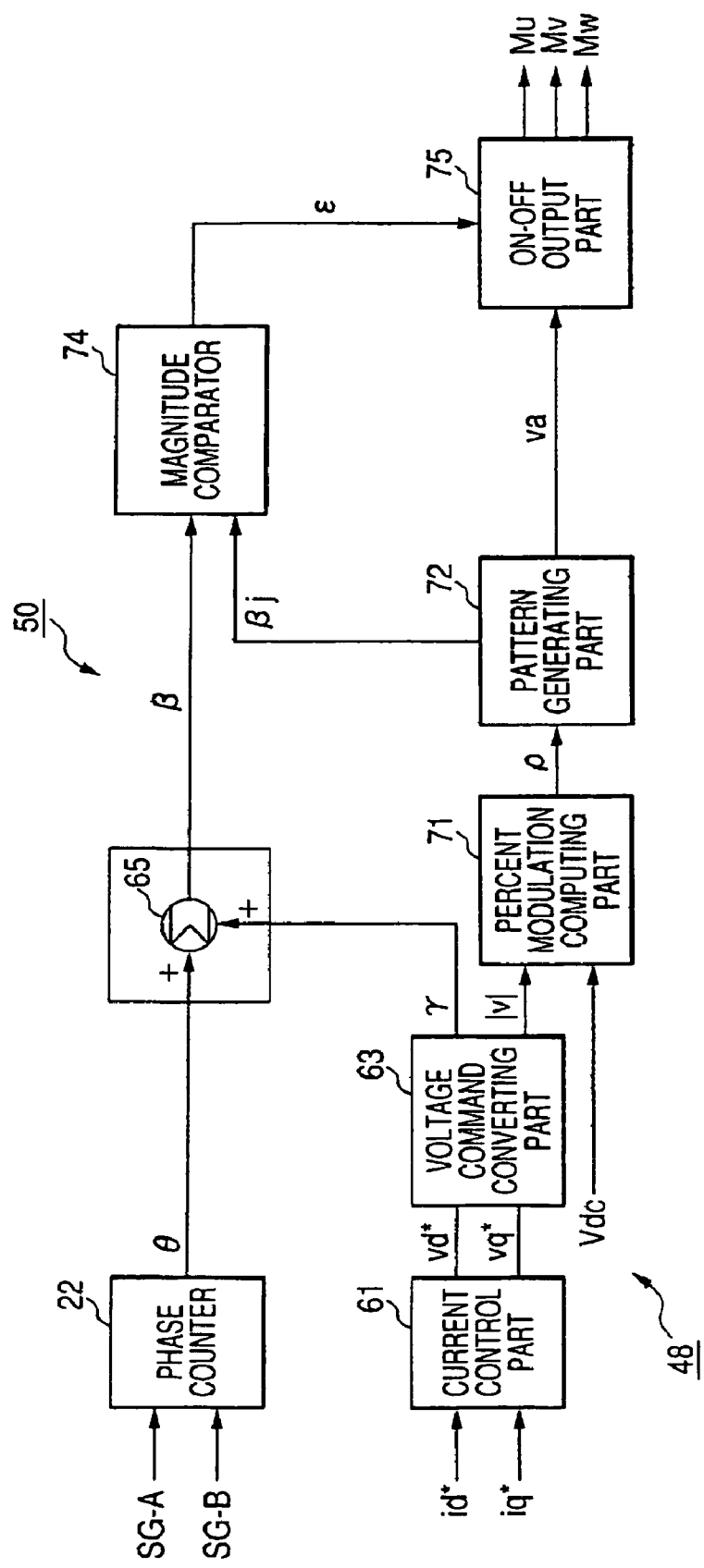
FIG. 2 is a block diagram illustrating the essential part of the traditional drive motor control unit.

Next, the operation of the drive motor control unit 45 will be described using FIG. 1. First, a phase counter 22, as a magnetic pole position computation processing module of the drive motor control unit 45, conducts a magnetic pole position computation process. It receives an A-phase signal SG-A and a B-phase signal SG-B, sent as the magnetic pole position signal SGθ, from the magnetic pole position sensor 21, and computes the magnetic pole position θ based on the signals SG-A and SG-B. In this case, the phase counter 22 counts pulses to compute the counted value as the magnetic pole position θ.

Then, a speed detecting part 23, as a rotational speed computation processing module of the drive motor control unit 45, conducts a rotational speed computation process. It differentiates the magnetic pole position θ to compute the angular velocity ω of the drive motor 31. The speed detecting part 23 also computes the drive motor rotational speed N that is the rotational speed of the drive motor 31 based on the angular velocity ω where the number of magnetic poles is p:

$$N = 60 \cdot (2/p) \cdot \omega / 2\pi.$$

The drive motor rotational speed N configures the electric machine rotational speed. Subsequently, a detected current acquisition processing module (not shown) of the drive motor control unit 45 conducts a detected current acquisition process. It reads and acquires the currents iu, iv, and computes the detected current iw based on the detected currents iu, iv for acquisition:

$$iw = -iu - iv.$$

In the embodiment, the drive motor control unit 45 is configured to conduct feedback control by vector control computing on the d-q coordinates where the d-axis is in the direction of the magnetic pole in the rotor and the q-axis is in the direction orthogonal to the d-axis. The detected currents iu, iv, iw on the fixed coordinates are converted to the currents on the d-q coordinates, that is, the d-axis current id and the q-axis current iq.

The drive motor control unit 45 drives the drive motor 31 based on the drive motor target torque TM* which represents the target value of the drive motor torque TM being the torque of the drive motor 31, the d-axis current id, the q-axis current iq, the magnetic pole position θ, the DC voltage Vdc, and the angular velocity ω. The drive motor torque TM configures electric machine torque, and the drive motor target torque TM* configures electric machine target torque.

Therefore, a velocity detection processing module (not shown) of the drive motor control unit 45 conducts a velocity detection process. It detects the velocity V corresponding to the drive motor rotational speed N based on the drive motor rotational speed N, and sends the detected velocity V to a vehicle control unit (not shown) which controls the overall electric car. A vehicle command value computation processing module of the vehicle control unit conducts a vehicle command value computation process. It reads the velocity V and the acceleration position α indicative of the position (press down amount) of a accelerator pedal (not shown) computes the vehicle request torque TO* based on the velocity V and the acceleration position, generates the drive motor target torque TM* in response to the vehicle request torque TO*, and sends the drive motor target torque TM* to the drive motor control unit 45.

The drive motor control unit 45 has a voltage command value computing part 48, as the voltage command value computation processing module, and a PWM generator 50, as an output signal generation processing module.

A current command value computing part (not shown) of the drive motor control unit 45, as a current command value computation processing module, conducts a current command value computation process. It reads the drive motor target torque TM*, refers to the current command value map set in the recording unit, computes the d-axis current command value id* and the q-axis current command value iq* that represent the individual target values of the d-axis current id and the q-axis current iq on the d-q coordinates corresponding to the drive motor target torque TM*, and sends the values to a voltage command value computation processing part 48.

The voltage command value computation processing part 48 has a current control part 61 as a current control processing module and a voltage command converting part 63 as a voltage command value conversion processing module in order to conduct a voltage command value computation process. The current control part 61 conducts a current control process. It reads the d-axis current command value id* and the q-axis current command value iq*, and computes the d-axis voltage command value vd* and the q-axis voltage command value vq* as first and second axis voltage command values. To this end, the current control part 61 computes the current deviation δid between the d-axis current command value id* and the d-axis current id and the current deviation δiq between the q-axis current command value iq* and the q-axis current iq, and conducts proportional integral computing formed of proportional control and integral control based on the individual current deviations δid and δiq.

The voltage command converting part 63 reads the d-axis voltage command value vd* and the q-axis voltage command value vq*, and converts the values to the voltage amplitude |v| and the voltage phase γ angle on the d-q coordinates. To this end, the voltage command converting part 63 has a voltage amplitude computing part as a first voltage command value conversion processing module and a voltage phase angle computing part as a second voltage command value conversion processing module (not shown). The voltage amplitude computing part conducts a first voltage command value conversion process, and computes the voltage amplitude |v|:

$$|v| = \text{the square root of } (vd^{*2} + vq^{*2}), \text{ and}$$

the voltage phase angle computing part conducts a second voltage command value conversion process, and computes the voltage phase angle γ:

$$\gamma = \arctan(vq^*/vd^*).$$

The PWM generator 50 conducts an output signal generation process. It reads the magnetic pole position θ, the angular velocity ω, the voltage amplitude |v|, the voltage phase angle γ, and the DC voltage Vdc, and generates the pulse width modulation signals Mu, Mv, Mw in a predetermined pattern as the asynchronous PWM signals or synchronous PWM signals of U-phase, V-phase, and W-phase.

To this end, the PWM generator 50 has a percent modulation computing part 71 as a percent modulation computation processing module, a pattern generating part 72 as a pattern generation processing module, a multiplier 81 as a magnetic pole position change computation processing module, an adder 82 as a first angle conversion processing module, a switching voltage phase angle predicting part 83 as a switching voltage phase angle prediction processing module, a subtracted 84 as a switching magnetic pole position angle computation processing module and a second angle conversion processing module, a memory 85 as a first recording part, a buffer 86 as a second recording part, a comparison match comparator 88 as a comparison processing module, and an on-off output part 89 as an on-off output processing module. The PWM signals are configured of the asynchronous PWM signal and the synchronous PWM signal.

The percent modulation computing part 71 conducts a percent modulation computation process. It reads the voltage amplitude |v| and the DC voltage Vdc, and computes the percent modulation ρ indicative of the voltage utilization rate based on the voltage amplitude |v| and the value 0.78× Vdc that represents an acceptable voltage:

$$\rho=|v|/(0.78\times Vdc).$$

The pattern generating part 72 conducts a pattern generation process. It reads the percent modulation ρ, and generates a predetermined pulse pattern in response to the percent modulation ρ. In the embodiment, a one-pulse pattern formed of a single pulse or a five-pulse pattern formed of five pulses is generated. In order to define the one-pulse pattern or five-pulse pattern, the switching angle βi (i=u, v, w) in the individual phases on the fixed coordinates and the output level va are computed. In addition, instead of the five-pulse pattern, pulse patterns formed of odd-numbered pulses, that is, a three-pulse pattern formed of three pulses, a seven-pulse pattern formed of seven pulses, and a nine-pulse pattern formed of nine pulses can be generated. In this case, the switching angle βi represents the voltage phase angle where switching is done by turning on and off in the range of ±180°.

The switching voltage phase angle predicting part 83 and the subtracted 84 configure a switching angle computation processing module 62. The switching angle computation processing module 62 conducts a switching angle computation process, and computes the switching angle βi where switching is done in the next control period Δt based on a predetermined pulse pattern.

The pulse pattern generated in the pattern generating part 72 sets the switching voltage phase angle, βj (j=u, w, v) corresponding to the switching angle βi in the individual phases. In this case, when the pulse width modulation signals Mu, Mv, Mw are to be turned on and off at the timing that the voltage phase angle β is equal to the switching voltage phase angle βj, the voltage phases need to be compared with each other, and a magnitude comparator is required as a comparator for comparing the voltage phases, leading to a cost increase in the motor drive control apparatus.

In the embodiment, the switching voltage phase angle predicting part 83 predicts a particular switching voltage phase angle among the switching voltage phase angle βj of the individual phases. In the embodiment, it predicts a switching voltage phase angle where the first switching is done in the next control period Δt as the particular switching voltage phase angle pβ. A switching magnetic pole position angle that corresponds to the particular switching voltage phase angle pβ and represents the magnetic pole position θ is set as pθ, and the pulse width modulation signals Mu, Mv, Mw are turned on and off when the magnetic pole position θ is equal to the switching magnetic pole position angle pθ.

To this end, the multiplier 81 conducts a magnetic pole position change computation process. It reads the angular velocity ω and the control period Δt, and computes the magnetic pole position change Δθ indicative of a change in the magnetic pole position θ in the control period Δt:

$$\Delta\theta=\omega\cdot\Delta t.$$

The adder 82 conducts a first angle conversion process. It reads the magnetic pole position θ, the voltage phase angle γ, and the magnetic pole position change Δθ at every control timing, and computes the voltage phase angle β' on the fixed coordinates in the next control timing:

$$\beta'=\theta+\Delta\theta+\gamma.$$

Subsequently, the switching voltage phase angle predicting part 83 conducts a switching voltage phase angle prediction process. It reads the voltage phase angle β' from the adder 82 and the switching angle βi in the individual phases from the pattern generating part 72, and predicts the particular switching voltage phase angle pβ. The particular switching voltage phase angle pβ represents the switching voltage phase angle where the first switching is done throughout the switching angle βi in the individual phases, and a single one is predicted.

Then, the subtracted 84 conducts a switching magnetic pole position angle computation process and a second angle conversion process. It reads the particular switching voltage phase angle pβ, subtracts the voltage phase angle γ from the particular switching voltage phase angle pβ, and computes the switching magnetic pole position angle pθ. For the switching magnetic pole position angle pθ, a single one is computed as corresponding to the particular switching voltage phase angle pβ as well.

A recording processing module (not shown) of the drive motor control unit 45 conducts a recording process, and stores the switching magnetic pole position angle pθ in the memory 85. In the memory 85, the magnetic pole position angle θi (i=u, v, w) corresponding to the switching angle βi in the individual phases is stored beforehand at every pulse pattern. Therefore, when a single switching magnetic pole position angle pθ is computed as corresponding to the particular switching voltage phase angle pβ, all of the magnetic pole position angles θi in the individual phases can be read out of the memory 85 based on the switching magnetic pole position angle pθ.

Subsequently, the recording processing module stores the starting magnetic pole position angle θis indicative of the first magnetic pole position angle in the magnetic pole position angle θi in the buffer 86. The comparison match comparator 88 reads the starting magnetic pole position angle θis out of the buffer 86 as well as reads the magnetic pole position θ from the phase counter 22, compares the magnetic pole position θ with the starting magnetic pole position angle θis, and determines whether the magnetic pole position θ is matched with the starting magnetic pole position angle θis. When the magnetic pole position θ is matched with the starting magnetic pole position angle θis, the comparison match comparator 88 generates the interrupt signal η as a comparison signal indicative of the comparison result, and sends it to the buffer 86 and the on-off output part 89.

When the on-off output part 89 receives the interrupt signal η, it conducts an on-off output process. It reads the output level va from the pattern generating part 72, forms the output level va to amplitude, generates the pulse width modulation signals Mu, Mv, Mw in the individual phases, that are turned on and off at the magnetic pole position θ corresponding to the starting magnetic pole position angle θis, and sends them to the drive circuit 51.

When the interrupt signal η is sent to the buffer 86, the recording processing module stores the next magnetic pole position angle θi having been stored in the memory 85 in the buffer 86 as the starting magnetic pole position angle θis. Accordingly, the magnetic pole position angle θi having been stored in the memory 85 is sequentially stored in the buffer 86 as the starting magnetic pole position angle θis. When the magnetic pole position θ is matched with the starting magnetic pole position angle θis, the pulse width modulation signals Mu, Mv, Mw in the individual phases are turned on and off at the magnetic pole position θ corresponding to the starting magnetic pole position angle θis.

In addition, a direct memory access (DMA) startup signal can be generated as the comparison signal instead of the interrupt signal η. In this case, the DMA startup signal is sent to the memory 85. When the memory 85 receives the DMA startup signal, it sequentially sends the magnetic pole position angle θi to the comparison match comparator 88.

The drive circuit 51 receives the pulse width modulation signals Mu, Mv, Mw in the individual phases to generate six drive signals, and sends the drive signals to the inverter 40. The inverter 40 switches the transistors Tr1 to Tr6 based on the drive signals to generate the currents Iu, Iv, Iw in the individual phases, and feeds the currents Iu, Iv, Iw in the individual phases to the stator coils 11 to 13 of the drive motor 31. In this manner, torque control is conducted based on the drive motor target torque TM*, and the drive motor 31 is driven to run the electric car.

Accordingly, the magnetic pole position θ is compared with the starting magnetic pole position angle θis in the comparison match comparator 88, the magnetic pole position θ is expressed by the counted value counted by the phase counter 22 and, thus, the comparison match comparator 88, mounted as the comparison processing module on the general-purpose microcomputer, can be used. Therefore, the cost of the motor drive control apparatus can be reduced.

In the exemplary embodiment, the motor drive control apparatus is adopted to the drive motor control unit 45 which drives the drive motor 31 as the electric machine, but it can be adopted to the generator control unit which drives the generator as the electric machine.

The invention is not limited to the exemplary embodiment, which can be modified variously based on the disclosed teachings, and the modifications will not be excluded from the scope of the invention.

What is claimed is:

1. A motor drive control apparatus, comprising:
   an electric machine;
   a magnetic pole position computation processing module which computes a magnetic pole position of the electric machine;
   a pattern generation processing module which generates a pulse pattern formed of a switching angle and an output level;
   a switching angle computation processing module which computes a switching angle where switching is done in a next control period based on the pulse pattern;
   a comparison processing module which compares the magnetic pole position with the computed switching angle to generate a comparison signal indicative of a comparison result; and
   an on-off output processing module which generates a PWM signal based on the comparison signal.

2. The motor drive control apparatus according to claim 1, wherein the switching angle computation processing module has:
   a switching voltage phase angle prediction processing module which predicts a switching voltage phase angle where switching is done in the next control period; and
   a switching magnetic pole position angle computation processing module which computes a switching magnetic pole position angle where switching is done in response to the switching voltage phase angle.

3. The motor drive control apparatus according to claim 1, wherein the magnetic pole position computation processing module is a phase counter.

4. The motor drive control apparatus according to claim 1, wherein the comparison processing module is a comparison match comparator.

5. A motor drive control method, comprising:
   computing a magnetic pole position of a electric machine;
   generating a pulse pattern formed of a switching angle and an output level;
   computing a switching angle where switching is done in a next control period based on the pulse pattern;
   comparing the magnetic pole position with the computed switching angle to generate a comparison signal indicative of a comparison result; and
   generating a PWM signal based on the comparison signal.

6. A program of a motor drive control method which allows a computer to function as:
   a magnetic pole position computation processing module which computes a magnetic pole position of a electric machine;
   a pattern generation processing module which generates a pulse pattern formed of a switching angle and an output level;
   a switching angle computation processing module which computes a switching angle where switching is done in a next control period based on the pulse pattern;
   a comparison processing module which compares the magnetic pole position with the computed switching angle to generate a comparison signal indicative of a comparison result; and
   an on-off output processing module which generates a PWM signal based on the comparison signal.

* * * * *